Patented Sept. 5, 1922.

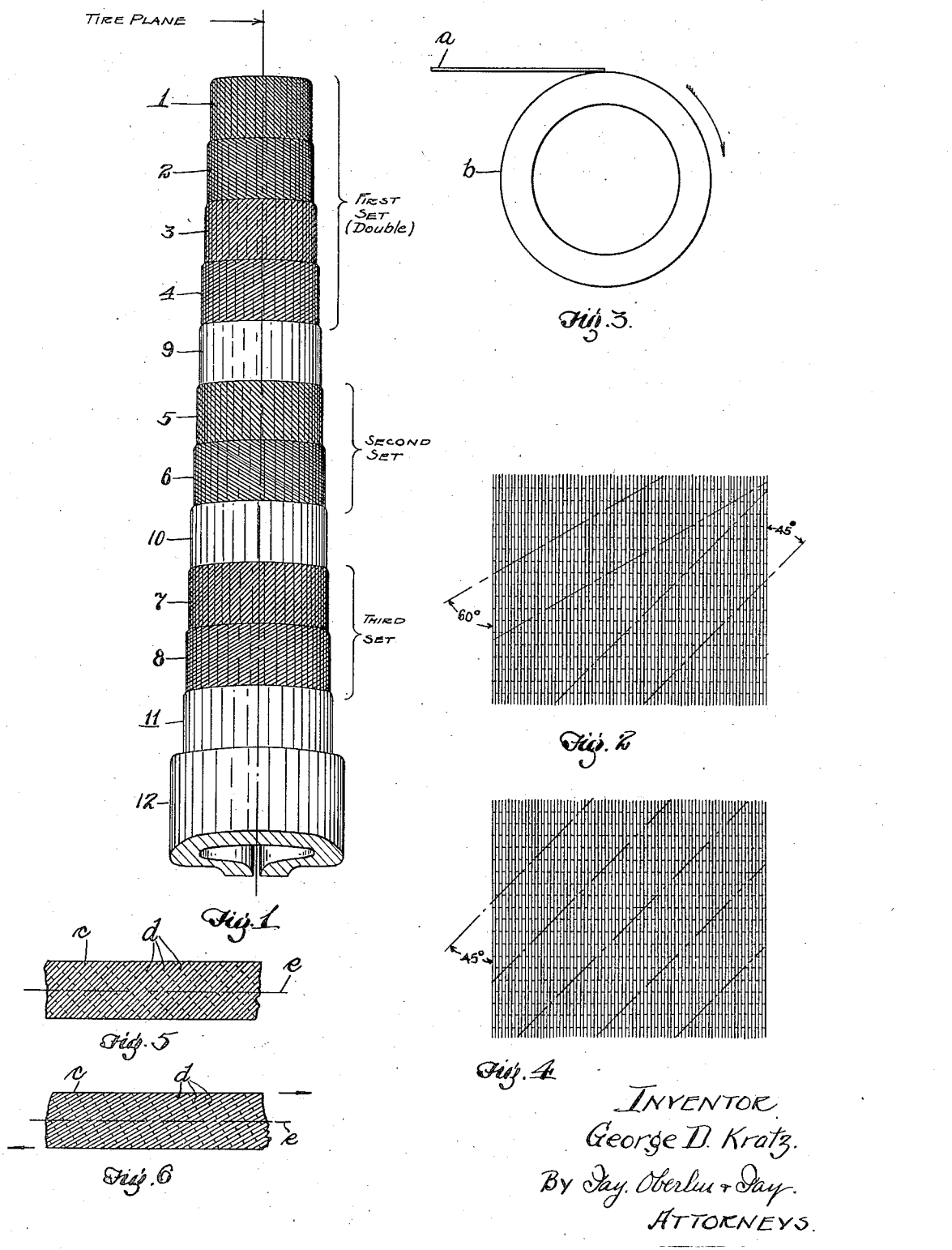

1,428,040

UNITED STATES PATENT OFFICE.

GEORGE D. KRATZ, OF AKRON, OHIO, ASSIGNOR TO THE FALLS RUBBER COMPANY, OF CUYAHOGA FALLS, OHIO, A CORPORATION OF OHIO.

TIRE AND METHOD OF MAKING SAME.

Application filed May 26, 1919. Serial No. 299,875.

*To all whom it may concern:*

Be it known that I, GEORGE D. KRATZ, a citizen of the United States, and a resident of Akron, county of Summit, and State of Ohio, have invented a new and useful Improvement in Tires and Methods of Making Same, of which the following is a specification, the principle of the invention being herein explained and the best mode in which I have contemplated applying that principle, so as to distinguish it from other inventions.

The present improvements, relating, as indicated, to tires and methods of making same, have more particular regard to tire-shoes or casings, such as are largely used for motor-driven vehicles. More particularly still, such improvements relate to that type of tire-shoe which is constructed of so-called thread-fabric or cord fabric, i. e., of a fabric composed of strong longitudinal warp threads held together by fine non-strength-giving weft threads. In fact, in some cases such warp threads are held together simply by the film or coating of rubber which is ordinarily used as a cementing or binding material to hold the several layers of the tire together. In the present specification it will accordingly be understood that by the term "warp threads" such longitudinal strength-giving threads are referred to, irrespective of how they are held together.

Tires of the type in question have, so far as I am aware, been heretofore constructed in either one or the other of two ways. According to the first method of manufacture the layers of fabric, suitably rubber coated, as previously indicated, are applied one upon the other in such a manner that the warp threads of each layer of fabric are at right angles to the warp threads of each contiguous layer of fabric, whether above or below it. For example, in a six-ply thread fabric tire-shoe, constructed in accordance with this first method, the first, third and fifth layers of such fabric will have their threads parallel with each other and at an angle of 45 degrees to the plane of the tire, while the second, fourth and sixth layers will have their warp threads parallel with each other and at an angle of 45 degrees to the plane of the tire, but at right angles to the warp threads of the first-mentioned layers. The objection to this construction is that when the warp threads of contiguous layers or plies of fabric are thus at right angles to each other, even though they be separated by a rubber cushion, excessive friction occurs due to chafing between the crossed strands, and the heat generated by such friction is sufficient to materially weaken the tire carcass and to decrease the life of the same. A second method of construction of the type of tire in hand has consisted in applying a set of two, three or more contiguous layers of thread fabric with their respective warp threads parallel with each other and at an angle to the tire plane, and superimposing thereon another set of two, three or more layers of such fabric with their respective warp threads likewise parallel with each other, but disposed at an angle to the warp threads of the first set. By this construction the number of contacting or rubbing surfaces has been reduced, and it has also been considered that such construction can be more readily repaired than the first described construction, inasmuch as two plies of thread fabric can be removed together, thus permitting the introduction of new plies to replace them, which is next to impossible where such plies lie at right angles to each other.

Despite the foregoing points of superiority over the first described construction such second construction has nevertheless been found not entirely satisfactory. In the first place, the initial strength of a tire carcass constructed according to such second method is less than that of a similar carcass constructed according to the first method. In the second place, when a tire of such second construction is inflated the strands or threads in each layer are separated, i. e., the distance between individual strands in each layer is increased, owing to the fact that such layer is distended to cover a larger area, according to the pressure to which the tire is inflated, and to the extent to which pressure causes the carcass to distend. Accordingly, as the parallel strands in two contiguous layers are thus forced apart, there is a tendency for such strands in the one layer to fall into the interstices of the other, with the result that the effect of but a single layer of fabric is secured. Accordingly, in practice, this second construction amounts to but little more than the first, the several parallel layers of each group becoming, in effect, a single layer which is disposed at right angles to the parallel layers of the other group. The object of the present invention is to overcome the objections just noted as existing in connection with each of the two methods heretofore devised for the construction of fabric tires of the type in hand.

To the accomplishment of this object I apply the various layers of rubber-coated thread fabric in sets composed of two, three or more layers so cut or disposed that the strands of no two contiguous layers are either parallel or at right angles to each other. I accomplish this result, either by the use of plies of fabric which are cut on the bias, but at two or more different angles to the strands themselves, or by cutting all such plies on the bias at the same angle and subsequently distorting the individual plies as they are fixed in place in the carcass, so that their relative angles will be different. The invention, then, consists of the steps and means hereinafter fully described and particularly pointed out in the claims, the annexed drawing illustrating but one of several ways in which the principle of the invention may be utilized or embodied.

In such annexed drawing, Fig. 1 is a plan view of a section of a tire, shown for convenience as a straight, instead of a curved section, and with successive portions broken away, better to illustrate the interior construction thereof; Fig. 2 is a plan view showing a sheet of the thread fabric and the manner in which successive strips or plies are cut therefrom in order to construct the tire in accordance with the present invention; Fig. 3 is a side elevation, more or less diagrammatic in character, illustrating the manner in which such plies or layers of fabric are secured to the carcass; Fig. 4 is a view similar to Fig. 2, but shows another method of cutting the strips or plies from the sheet of fabric; Fig. 5 is a view of such a strip or ply; and Fig. 6 is a view of the same strip as in Fig. 5, but after it has been distorted or stretched to give the effect of the cutting of the same on a different angle from the original sheet.

In the illustrative construction of tire shown in Fig. 1, an eight-ply tire, or rather tire-shoe, is shown, the plies or layers of fabric being arranged in three sets, each made up of a plurality of contiguous layers or plies of thread fabric. The innermost of these sets, as shown at the upper end of the figure in question, is really a double set, being composed of four layers or plies, 1, 2, 3 and 4, the first such layer or ply being cut so that the strands therein lie at an angle of 45 degrees to the plane of the tire, and such layer being applied so that such strands run to the right of such plane; (that is, such strands lie at the angle and run in the direction stated with respect to a median circumferential line passing around the periphery of the tire, assuming such strip to be regarded from the outside of the tire and as being disposed in tangential relation thereto), the second layer or ply being cut at an angle of 30 degrees to the tire plane, and being applied so as to have the strands run to the right of such plane; the third layer or ply being cut at an angle of 45 degrees to the tire plane and being applied to have the strands run to the left of such plane; and the fourth layer or ply being cut at an angle of 30 degrees to the tire plane and being applied so as to have the strands run to the left of such plane. The relation of the various layers or threads in the layers comprising such set may be also described by stating that such layers or threads are at a slight angle to each other and diverge from each other at a median line at or parallel to the periphery of the tire, both threads lying in the quadrant formed by such a median line and a line at right angles to it passing through the point of intersection of said thread. The second set of contiguous layers of fabric comprises two such layers 5 and 6, the first of which is cut at an angle of 45 degrees to the tire plane and applied so as to have the strands run to the right of such plane, and the second of which is cut at an angle of 30 degrees and applied so as to have the strands run in the same direction as the first. The third set of contiguous layers of fabrics also comprises but two such layers 7 and 8, the first of which is cut at an angle of 45 degrees to the tire plane, but is then applied so as to have the strands run to the left of such plane, the second layer being cut at an angle of 30 degrees to the tire plane and applied so as to have the strands run in the same direction.

In between each successive set of such layers or plies of fabric there are preferably interposed layers 9 and 10 of rubber. respectively, which function in an insulating and cushioning capacity, but these rubber cushions are not essential. The outermost or last-mentioned set of layers of fabric is then covered by the usual breaker strip 11, which is composed of a heavy gum cushion of suitably prepared rubber calendered upon an open-weave fabric. Finally the whole is covered with an outer layer 12 of rubber constituting the tread of the tire.

Where the several strips, composing the successive sets of layers or plies of fabric, are initially cut from the original sheet of fabric upon the bias so that the strands therein will have the relative angularities described above, (see Fig. 2), the process of building my improved tire from these separate layers of fabric, rubber cushions and tread upon a solid or collapsible form or core and then vulcanizing it, will be precisely the same as the method in current use in building tires, and need not, therefore, be further described. In Fig. 3 I illustrate diagrammatically the manner in which a strip *a* of fabric is applied to the core or carcass *b*, the arrow indicating the direction in which the core is intended to be rotated.

However, instead of thus initially cutting the several strips or layers of fabric in question so that the strands will lie at the desired angle, this involving a certain element of wastage, as will be indicated by an inspection of Fig. 2, I preferably cut these strips all in the same angle, thus reducing wastage to a minimum. Assuming the angle chosen to be 45 degrees, the typical strip *c* will then present the appearance illustrated in Fig. 5, which strip will obviously serve, without change, for half of the total number of strips required in the construction of the tire as just described, inasmuch as by simply reversing the strip, the strands *d* may be caused to run either to the right or left of the plane of the tire, as desired. In order to secure a different degree of angularity for the strands in the strip as applied from that to which the strip is thus initially cut, I then proceed as follows:—
The strip cut as aforesaid, as later applied to the core or partially assembled carcass, is attached along its median line *e* only in the first instance. Then by pulling in opposite directions on the respective lateral edges of the strip, one such edge is applied in advance, and the other to the rear of its normal position, thus increasing or decreasing the angularity at which the strands lie to the plane of the tire. I have found it entirely feasible to change such angularity in this fashion from 45 degrees to 30 degrees, as illustrated in Fig. 6, for example, or reversely from 30 degrees to 45 degrees, and if preferred the strip may be distorted before it is applied.

Whichever method of construction is employed, it will be obvious that by arranging the superimposed layers or plies of fabric which compose the successive sets of such fabric, so that, while slightly divergent, the warp threads of said layers nevertheless run in the same direction (i. e., any two intersecting threads lie on the same side of a transverse line drawn through their points of intersection), I reduce the detrimental effects caused by the parallelism of strands in contiguous plies, and at the same time retain the greater portion of the initial strength obtained by crossing alternate and contiguous plies at right angles to each other. In other words, my method of superimposing plies of fabric, which have either been cut on the bias at two or more slightly divergent angles to the strands or threads, or else distorted or stretched to give the same effect, combines the advantages sought for in both of the two methods heretofore utilized, while at the same time I reduce the detrimental feature of chafing between the plies and its attending friction, which results in weakening the tire carcass. Finally, it will be seen that while my improved construction retains the carcass strength previously obtained by the first descrbed prevailing construction, the added resiliency obtained by the second such construction has not been sacrificed.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. A component for a tire of the character described, comprising a set of superposed contiguous layers of thread fabric having their respective warp-threads lying at a slightly divergent angle to each other, but extending in the same general direction relative to a median line around the periphery of the tire, i. e. any two intersecting threads lie in the same quadrant formed by a transverse line and a line parallel with said median line passing through the point of intersection of said threads.

2. A tire of the character described, comprising a set of superposed contiguous layers of thread fabric having their respective warp-threads lying at a slightly divergent angle to each other but extending in the same general direction to the tire plane, i. e. any two intersecting threads lie in the same quadrant formed by a transverse line and a line parallel with said median line passing through the point of intersection of said threads, and another set of similar layers having their respective warp-threads also lying at a slightly divergent angle to each other, the warp-threads of said second set of layers similarly extending in the same general direction relatively to the tire plane but at an angle to the warp-threads of the first set of layers.

3. A tire of the character described, comprising a set of superposed contiguous layers of thread fabric having their respective warp-threads lying at a slightly divergent angle to each other but running in the same general direction relatively to the tire-plane, i. e. any two intersecting threads lie on the same side of a transverse line through their point of intersection, and another set of similar layers having their respective warp-threads also lying at a slightly divergent angle to each other, the warp-threads of said second set of layers similarly running in the same general direction relatively to the tire-plane but at an angle to the warp-threads of the first set of layers less than a right angle.

4. A tire of the character described, comprising a set of superposed contiguous layers of thread fabric having their respective warp-threads lying at a slightly divergent angle to each other, but running in the same general direction relatively to the tire-plane, i. e. any two intersecting threads lie in the same quadrant formed by a transverse line and a line parallel with a median line around the periphery of the tire passing through the point of intersection of such threads, another set of similar layers having their respective warp-threads also lying at a slightly divergent angle to each other, the warp-threads of such second set of layers similarly running in the same general direction relatively to the tire-plane but at an angle to the warp-threads of the first set of layers, and a layer of rubber forming a cushion between said two sets of fabric layers.

5. In a method of making tires of the character described, the steps which consist in applying circumferentially to a suitable mandrel a strip of fabric cut on the bias first along the median line of such strip and then retarding one edge only of such strip so as to modify the angularity of the component warp-threads therein relatively to the plane of such mandrel before fully applying such strip.

6. In a method of making tires of the character described, the steps which consist in applying circumferentially to a suitable mandrel a strip of fabric cut on the bias first along the median line of such strip and then pulling on the respective edges of said strip in opposite directions so as to modify the angularity of the component warp-threads therein relatively to the plane of such mandrel before fully applying such strip.

7. In a method of making tires of the character described, the steps which consist in applying circumferentially to a suitable mandrel successive strips of fabric on the bias, and distorting or stretching alternate such strips incidentally to application so as to vary the angularity of the component warp-threads from normal relatively to the plane of such mandrel.

Signed by me, this 23rd day of May, 1919.

GEORGE D. KRATZ.